(12) United States Patent
Kim et al.

(10) Patent No.: US 8,019,001 B2
(45) Date of Patent: *Sep. 13, 2011

(54) PREDICTION IMAGE GENERATING METHOD AND APPARATUS USING SINGLE CODING MODE FOR ALL COLOR COMPONENTS, AND IMAGE AND VIDEO ENCODING/DECODING METHOD AND APPARATUS USING THE SAME

(75) Inventors: Wooshik Kim, Yongin-si (KR); Hyun Mun Kim, Seongnam-si (KR); Daesung Cho, Seoul (KR); Dmitri Birinov, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1508 days.

This patent is subject to a terminal disclaimer.

(21) Appl. No.: 11/362,920

(22) Filed: Feb. 28, 2006

(65) Prior Publication Data

US 2006/0203913 A1    Sep. 14, 2006

(30) Foreign Application Priority Data

Feb. 28, 2005    (KR) ........................ 10-2005-0016938

(51) Int. Cl.
*H04N 11/02* (2006.01)
(52) U.S. Cl. .................................................. 375/240.16
(58) Field of Classification Search ............. 375/240.12, 375/240.13, 240.16
See application file for complete search history.

(56) References Cited

U.S. PATENT DOCUMENTS 5,151,784 A * 9/1992 Lavagetto et al. ....... 375/240.12
(Continued)

FOREIGN PATENT DOCUMENTS

CN    1578477 A    2/2005
(Continued)

OTHER PUBLICATIONS

Thomas Wiegand et al., "Text of ISO/IEC FDIS 14496-10: Information Technology—Coding of audio-visual objects—Part 10: Advanced Video Coding", ISO/IEC JTC 1/SC 29/WG 11, N5555, Mar. 31, 2003, 269 pages.

(Continued)

*Primary Examiner* — Khanh C Tran
(74) *Attorney, Agent, or Firm* — Staas & Halsey LLP

(57) ABSTRACT

A prediction image generation method and apparatus using a single coding mode for all color components and image and video encoding and decoding methods and apparatuses using the same are provided. The prediction image generation apparatus includes: a spatial prediction image generation unit applying an identical prediction direction for each image component in an original image composed of at least two image components, and obtaining a spatial prediction image from a pixel spatially close to a pixel block of a predetermined size of a current frame; a temporal prediction image generation unit applying an identical block size, motion vector, and motion interpolation method for each image component in an original image composed of at least two image components, and obtaining a temporal prediction image by estimating motion in units of blocks of a predetermined size between a previous frame and a current frame of each of the image components; an encoding mode selection unit selecting an encoding mode by using the spatial prediction image and the temporal prediction image; and a single mode prediction image generation unit generating a prediction image by identically applying the encoding mode selected in the encoding mode selection unit to each component. By increasing the redundancy of information between prediction error signals of color components, the encoding efficiency can be enhanced in the method and apparatus.

37 Claims, 10 Drawing Sheets

U.S. PATENT DOCUMENTS

| | | | | |
|---|---|---|---|---|
| 5,515,377 A | * | 5/1996 | Horne et al. | 370/395.64 |
| 5,835,138 A | * | 11/1998 | Kondo | 348/207.99 |
| 6,192,079 B1 | * | 2/2001 | Sharma et al. | 375/240.16 |
| RE37,668 E | * | 4/2002 | Etoh | 382/251 |
| 7,813,432 B2 | * | 10/2010 | Wang | 375/240.24 |
| 2004/0001546 A1 | * | 1/2004 | Tourapis et al. | 375/240.12 |
| 2005/0259879 A1 | * | 11/2005 | Hellman | 382/239 |

FOREIGN PATENT DOCUMENTS

| | | |
|---|---|---|
| EP | 1 507 415 A2 | 2/2005 |
| KR | 10-2004-0099086 | 11/2004 |

OTHER PUBLICATIONS

Kim et al., "(Proposal) Color format Extension", Joint Video Team (JVT) of ISO/IEC MPEG & ITU-T VCEG(ISO/IEC/JTCI/SC29/WG11 and ITU-T SG16 06) Jan. 17, 2005, No. JVT-H018.

Woo-Shik Kim et al., "Enhancements of RGB Coding in H.264/MPEG-4 AVC FRExt" Jun. 30, 2005.

Sullivian G. J. et al.,"Rate-Distortion Optimization for Video Compression", IEEE Signal Processing Magazine, IEEE Service Center, Piscataway, NJ, US, vol. 15, No. 6, Nov. 1, 1998, pp. 74-90.

Wiegand T et al., "Overview of the H.264/AVC video coding standard", IEEE Transactions of Circuits and Systems for Video Technology, IEEE Service Center, Piscataway, NJ, US, vol. 13, No. 7, Jul. 1, 2003, pp. 560-576.

European Search Report mailed Jul. 6, 2009 and issued in corresponding European Patent Application 06251035.9.

Chinese Office Action issued Sep. 11, 2009 in corresponding Chinese Patent Application 200610058050.0.

Korean Office Action issued on Aug. 29, 2006 with respect to Korea Patent Application No. 10-2005-0016938, which corresponds to the above-referenced application.

Chinese Office Action issued Jul. 12, 2010 in corresponding Chinese Patent Application 200610058050.0.

Chinese Office Action issued Mar. 9, 2011 in corresponding Chinese Patent Application 201010288334.5.

Woo-Shik Kim et al., "Color Format Extension", Joint Video Team (JVT) of ISO/IEC MPEG & ITU-T VCEG (ISO/IEC JTC1/SC29/WG11 and ITU-T-SG16 Q.6) 8$^{th}$ Meeting: Gevenva, Switzerland, May 23, 2003, [JVT-H018], pp. 1-17.

Japanese Office Action issued May 10, 2011 in corresponding Japanese Patent Application 2006-052657.

* cited by examiner

FIG. 9
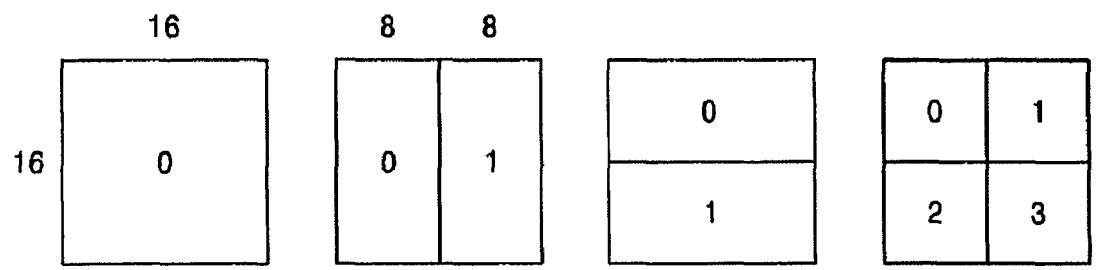
MACRO BLOCK PARTITIONS : 16x16, 16x8, 8x 6, 8x8
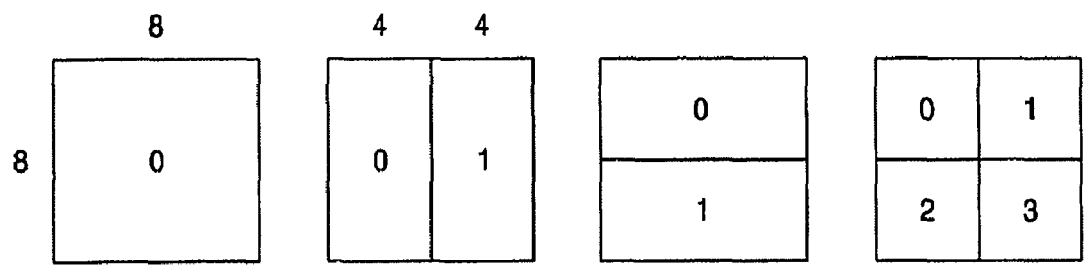
8x8 BLOCK PARTITIONS : 8x8, 8x4, 4x8, 4x4

PREDICTION IMAGE GENERATING METHOD AND APPARATUS USING SINGLE CODING MODE FOR ALL COLOR COMPONENTS, AND IMAGE AND VIDEO ENCODING/DECODING METHOD AND APPARATUS USING THE SAME

CROSS-REFERENCE TO RELATED APPLICATION

This application claims the benefit of Korean Patent Application No. 10-2005-0016938, filed on Feb. 28, 2005, in the Korean Intellectual Property Office, the disclosure of which is incorporated herein in its entirety by reference.

BACKGROUND OF THE INVENTION

1. Field of the Invention

The present invention relates to color image encoding and/or decoding, and more particularly, to image and video encoding and decoding methods and apparatuses using a single coding mode for all color components.

2. Description of the Related Art

Generally, an image obtained by a device in an RGB format. However, when the image thus obtained is compressed, the image is converted into a YCbCr image format. At this time, Y is monochrome and has only a luminance component and Cb and Cr have chrominance components. In the RGB image, information is evenly distributed between R, G, and B data, but in the YCbCr image format, information is concentrated in the Y component, and less information is in the Cb and Cr components. Accordingly, when compression is performed in the YCbCr image format, the compression efficiency is enhanced.

Since the statistical characteristics of the Y component in the YCbCr image is different from the statistical characteristics of the Cb and Cr components, in a conventional encoding method, the Y component and the Cb and Cr components are compressed using different methods, respectively. For example, in the MPEG-4 AVC/H.264 standard produced by Joint Video Team of ISO/IEC MPEG and ITU-T VCEG, which has been standardized recently ("Text of ISO/IEC FDIS 14496-10: Information Technology—Coding of audio-visual objects—Part 10: Advanced Video Coding", ISO/IEC JTC 1/SC 29/WG 11, N5555, March 2003), when the Y component is encoded as an intra image in a video signal, spatial prediction is performed in units of 4×4 blocks using 9 prediction methods along a prediction direction. Also, spatial prediction can be performed in units of 16×16 blocks using 4 prediction methods along a prediction direction. However, since the image containing Cb and Cr components is relatively simpler than an image containing the Y component, when the Cb and Cr components are encoded as an intra image in a video signal, spatial prediction is performed in units of 8×8 blocks along a prediction direction using 4 prediction methods, independently of the Y component.

Also, when encoding of an image is performed in inter mode, motion compensation of the Y component is precisely performed by expanding a prediction image using a 6-tap filter, while motion compensation of Cb and Cr components is performed by expanding a prediction image using a bilinear filter. Thus, in the conventional method, different compression methods are used for the Y component and Cb and Cr components to compress an image because the statistical characteristics of the Y component and the Cb and Cr components are different from each other.

However, when an RGB image is converted into a YCbCr image, loss of image quality, such as color distortion, can occur, and therefore, a direct encoding method of an RGB image has been researched recently. In particular, a fidelity range extension standard of the MPEG-4-AVC/H.264 standard supports direct encoding of an RGB image. In this newly adopted technology, a residue transform technology is used to perform spatial or temporal prediction in the RGB image, and after a residue image is obtained, redundant information existing in each of R, G, and B data is removed such that the encoding efficiency is enhanced without lowering the picture quality.

When the RGB image is encoded, the encoding efficiency of the conventional method is lowered as described above because the method used for the YCbCr is applied without change. Accordingly, when the RGB input image is encoded in an RGB domain without converting the image into a YCbCr image, a method of enhancing the encoding efficiency with maintaining a high picture quality by performing spatial prediction and temporal prediction in accordance with the statistical characteristics of the RGB image is needed.

SUMMARY OF THE INVENTION

Additional aspects and/or advantages of the invention will be set forth in part in the description which follows and, in part, will be apparent from the description, or may be learned by practice of the invention.

The present invention provides a method of generating a spatial prediction image using a single coding mode for all color components.

The present invention also provides a method of generating a temporal prediction image using a single coding mode for all color components.

The present invention also provides a method and apparatus for generating a prediction image using a single coding mode for all color components.

The present invention also provides an image and video encoding method and apparatus using a single coding mode.

The present invention also provides an image and video decoding method and apparatus using a single coding mode.

According to an aspect of the present invention, there is provided a spatial prediction image generation method including: applying an identical prediction direction for each image component in an original image composed of at least two image components; and obtaining a spatial prediction image from a pixel spatially close to a pixel block of a predetermined size of a current frame.

The size of the pixel block may be 4×4, and any one of 9 prediction directions may be determined to be the prediction direction.

According to another aspect of the present invention, there is provided a temporal prediction image generation method including: applying an identical block size, motion vector, and motion interpolation method for each image component in an original image composed of at least two image components; and obtaining a temporal prediction image by estimating motion in units of blocks of a predetermined size between a previous frame and a current frame of each of the image components.

According to still another aspect of the present invention, there is provided a prediction image generation method including: applying an identical prediction direction for each image component in an original image composed of at least two image components; obtaining a spatial prediction image from a pixel spatially close to a pixel block of a predetermined size of a current frame; applying an identical block size, motion vector, and motion interpolation method for each image component in an original image composed of at least two image components; obtaining a temporal prediction image by estimating motion in units of blocks of a predetermined size between a previous frame and a current frame of each of the image components; selecting an encoding mode using the spatial prediction image and the temporal prediction image; and generating a prediction image by identically applying the selected encoding mode to each component.

In the selection of the encoding mode, the bit quantity and distortion of the picture quality of each of the spatial prediction image and the temporal prediction image may be calculated and an encoding mode corresponding to the smallest sum obtained by adding the bit quantity and distortion of the picture quality for each of the spatial prediction image and the temporal prediction image may be selected as the encoding mode.

According to yet still another aspect of the present invention, there is provided a prediction image generation apparatus including: a spatial prediction image generation unit applying an identical prediction direction for each image component in an original image composed of at least two image components, and obtaining a spatial prediction image from a pixel spatially close to a pixel block of a predetermined size of a current frame; a temporal prediction image generation unit applying an identical block size, motion vector, and motion interpolation method for each image component in an original image composed of at least two image components, and obtaining a temporal prediction image by estimating motion in units of blocks of a predetermined size between a previous frame and a current frame of each of the image components; an encoding mode selection unit selecting an encoding mode by using the spatial prediction image and the temporal prediction image; and a single mode prediction image generation unit generating a prediction image by identically applying the encoding mode selected in the encoding mode selection unit to each component.

The encoding mode selection unit may include: a spatial bit quantity/picture quality distortion calculation unit calculating the bit quantity and distortion of the picture quality of the spatial prediction image; a temporal bit quantity/picture quality distortion calculation unit calculating the bit quantity and distortion of the picture quality of the temporal prediction image; and a performance comparison unit comparing values obtained by adding the bit quantity and the picture quality distortion of each of the spatial prediction image and the temporal prediction image, and selecting an encoding mode corresponding to the smaller value.

According to a further aspect of the present invention, there is provided an image encoding apparatus using a single coding mode for all color components including: a prediction image generation unit generating a prediction image by using an identical encoding mode for each image component in an original image composed of at least two image components; a residue generation unit generating a residue corresponding to the difference between the original image and the prediction image; and an encoding unit generating a bitstream by encoding the residue data.

The prediction image generation unit may include: a spatial prediction image generation unit obtaining a prediction image by applying an identical prediction direction from a pixel spatially adjacent to a pixel block of a current frame for each image component of the original image when performing an intra method; a temporal prediction image generation unit obtaining a prediction image by applying identical motion estimation motion interpolation methods in units of blocks of identical size between a previous frame and a current frame for each image component of the original image when performing an inter method; an encoding mode selection unit selecting an encoding mode by using the spatial prediction image and the temporal prediction image; and a single mode prediction image generation unit generating a prediction image by identically applying the encoding mode selected in the encoding mode selection unit to each component of the color image.

The encoding mode selection unit may include: a spatial bit quantity/picture quality distortion calculation unit calculating the bit quantity and distortion of the picture quality of the spatial prediction image; a temporal bit quantity/picture quality distortion calculation unit calculating the bit quantity and distortion of the picture quality of the temporal prediction image; and a performance comparison unit comparing values obtained by adding the bit quantity and the picture quality distortion of each of the spatial prediction image and the temporal prediction image, and selecting an encoding mode corresponding to the smaller value.

The apparatus may further include a residue transform unit performing a residue transform on the residue generated by the residue generation unit using a correlation between residues of the image components, wherein the encoding unit generates the residue of each image component as a bitstream.

The apparatus may further include a transform/quantization unit performing transform and quantization on the residue transformed by the residue transform unit, in units of blocks of a predetermined size, wherein the encoding unit generates each of the transformed and quantized coefficients as a bitstream.

According to an additional aspect of the present invention, there is provided an image encoding method using a single coding mode for all color components including: generating a prediction image by using an identical encoding mode for each image component in an original image composed of at least two image components; generating a residue corresponding to the difference between the original image and the prediction image; and generating a bitstream by encoding the residue data.

The generating of the prediction image may include: obtaining a prediction image by applying an identical prediction direction from a pixel spatially adjacent to a pixel block of a current frame for each image component of an original image composed of at least two image components; obtaining a prediction image by applying an identical block size, motion vector, and motion interpolation method for each image component in an original image composed of at least two image components, and by estimating motion in units of blocks of a predetermined size between a previous frame and a current frame of each of the image components; selecting an encoding mode by using the spatial prediction image and the temporal prediction image; and generating a prediction image by identically applying the selected encoding mode to each component of the color image.

In the selecting of the encoding mode, the bit quantity and distortion of the picture quality of each of the spatial prediction image and the temporal prediction image may be calculated and an encoding mode corresponding to a smallest sum of the bit quantity and distortion of the picture quality of each of the spatial prediction image and the temporal prediction image may be selected as an encoding mode.

The method may further include performing a residue transform on the generated residue using a correlation between residues of the image components, wherein, in the generating of the bitstream, the transformed residue for each image component is generated as a bitstream.

The method may further include performing a transform and quantization on the transformed residue in units of blocks of a predetermined size, wherein, in the generating of the bitstream, each of the transformed and quantized coefficients is generated as a bitstream.

According to an additional aspect of the present invention, there is provided an image decoding apparatus using a single coding mode for all color components including: a data restoration unit restoring residue information by decoding the residue information from a bitstream when it is assumed that the difference between an original image composed of at least two image components and a prediction image in the original image is a residue; and a prediction compensation unit restoring an image by adding a prediction image generated by applying an identical encoding mode to the restored residue data.

The prediction compensation unit may include: a spatial prediction compensation unit restoring an image by adding to the restored residue data a prediction image obtained by applying an identical prediction direction from a pixel spatially close to a pixel block of a current frame for each image component of the original image, when performing an intra method; and a temporal prediction compensation unit restoring an image by adding to the restored residue data a prediction image obtained by applying identical motion estimation motion and interpolation methods in units of blocks of identical size between a previous frame and a current frame for each image component of the original image, when performing an inter method.

The apparatus may further include an inverse residue transform unit performing inverse transform on residue transformed data using a correlation between residues of the image components if the data restored in the data restoration unit is residue transformed data, wherein the prediction compensation unit performs prediction compensation by adding to the inverse residue transformed residue a prediction image generated using an identical encoding mode for each image component.

The apparatus may further include an inverse quantization/inverse transform unit performing inverse quantization and an inverse transform on transformed and quantized data in units of blocks of a predetermined size if the data restored in the data restoration unit is transformed and quantized residue data, wherein the prediction compensation unit performs prediction compensation by adding to the inverse quantized and inverse transformed residue a prediction image generated using an identical encoding mode, for each image component.

According to an additional aspect of the present invention, there is provided an image decoding method using a single coding mode for all color components including: restoring residue information by decoding the residue information from a bitstream when it is assumed that the difference between an original image composed of at least two image components and a prediction image in the original image is a residue; and restoring an image by adding a prediction image generated by applying an identical encoding mode to the restored residue data.

The restoring of the image may include: obtaining a prediction image by applying an identical prediction direction from a pixel spatially close to a pixel block of a current frame for each image component of the original image, when performing an intra method; and obtaining a prediction image by applying identical motion estimation and motion interpolation methods in units of blocks of identical size between a previous frame and a current frame for each image component of the original image, when performing an inter method.

The method may further include performing an inverse transform on the generated residue using a correlation between residues of the image components, wherein an image is restored by adding to the inverse residue transformed residue a prediction image generated using an identical encoding mode for each image component.

The method may further include performing inverse quantization and an inverse transform on the generated residue in units of blocks of a predetermined size, wherein an image is restored by adding to the inverse quantized and inverse transformed residue a prediction image generated using an identical encoding mode, for each image component.

According to an additional aspect of the present invention, there is provided a computer readable recording medium having embodied thereon a computer program for executing the methods.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 illustrates a method of dividing a macroblock in ME/MC (Motion Estimation/Motion Compensation) for temporal prediction according to an embodiment of the present invention;

DETAILED DESCRIPTION OF THE PREFERRED EMBODIMENTS

Figure 1:
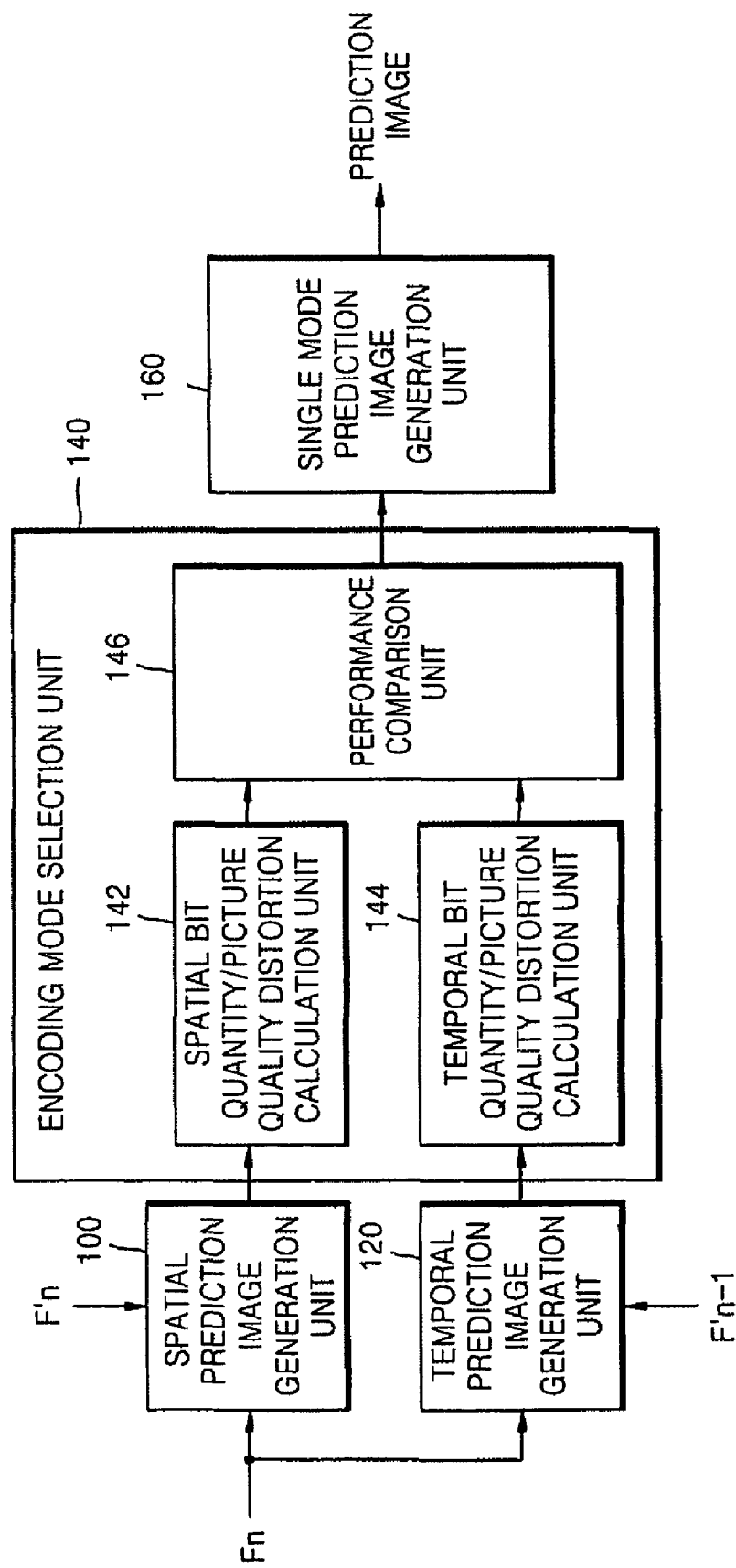
FIG. 1 is a block diagram of a prediction image generation apparatus using a single coding mode among color components according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which exemplary embodiments of the invention are shown.

FIG. 1 is a block diagram of a prediction image generation apparatus using a single coding mode among color components according to an embodiment of the present invention. Referring to FIG. 1, the prediction image generation apparatus includes a spatial prediction image generation unit 100, a temporal prediction image generation unit 120, an encoding mode selection unit 140, and a single mode prediction image generation unit 160.

The spatial prediction image generation unit 100 applies an (a substantially) identical prediction method to each image component in an original image composed of at least two image components, and generates a spatial prediction image from a pixel spatially close to a pixel block of a predetermined size in a current frame.

The temporal prediction image generation unit 120, using an (a substantially) identical block size and an (a substantially) identical motion vector, applies an (a substantially) identical motion interpolation method to each image component in the original image composed of at least two image components, and generates a temporal prediction image by estimating motion in units of blocks of a predetermined size between a previous frame and a current frame of each image component.

The encoding mode selection unit 140 selects an encoding mode based on the spatial prediction image and the temporal prediction image. The encoding mode selection unit 140 includes a spatial bit quantity/picture quality distortion calculation unit 142, a temporal bit quantity/picture quality calculation unit 144, and a performance comparison unit 146.

In relation to the spatial prediction image, the spatial bit quantity/picture quality distortion unit 142 calculates the bit quantity and the distortion of the picture quality of the spatial prediction image. The temporal bit quantity/picture quality distortion unit 144 calculates the bit quantity and the distortion of the picture quality of the temporal prediction image. The performance comparison unit 146 compares values obtained by adding the number of bits constituting and the distortion of the picture quality of each of the spatial and temporal prediction images, and selects an encoding mode corresponding to a smaller value as a single encoding mode.

The single mode prediction image generation unit 160 generates a prediction image by applying the selected encoding mode to each component of the color image.

Figure 2:
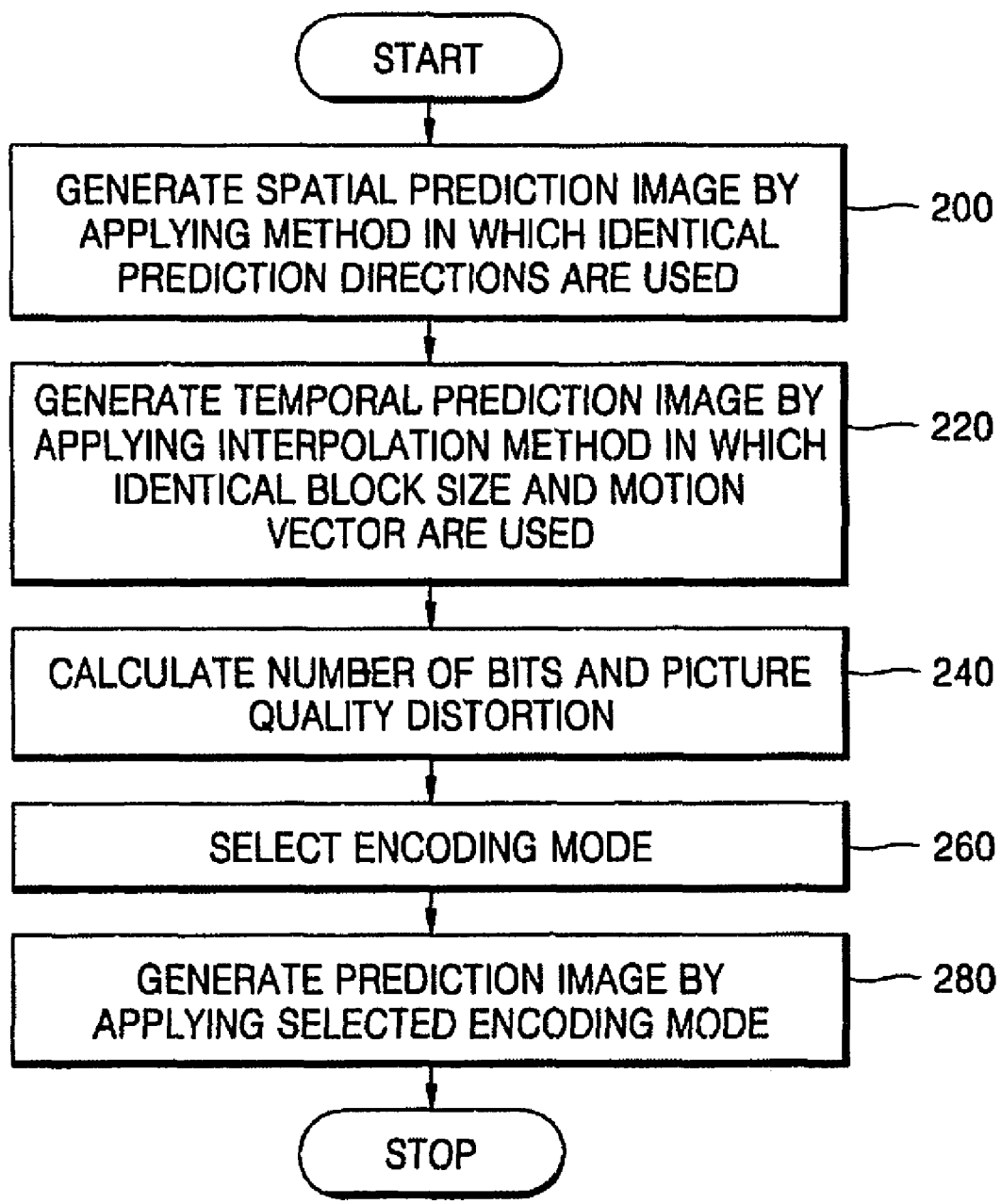
FIG. 2 is a flowchart of a prediction image generation method according to an embodiment of the present invention.

FIG. 2 is a flowchart of a prediction image generation method according to an embodiment of the present invention. The method will now be briefly explained. By applying a method using identical prediction directions to the respective color component of a color image, a spatial prediction image is generated in operation 200. Also, using identical block sizes and identical motion vectors, an identical motion interpolation method is applied to each color component in the original image, and a temporal prediction image is generated in operation 220. The number of bits constituting and the distortion of the picture quality of each of the generated spatial and temporal prediction images is calculated in operation 240. By comparing the calculated results, an encoding mode producing an image with the smallest number of bits and/or distortion of picture quality is selected in operation 260. A prediction image is generated by applying the selected encoding mode in operation 280.

The method of generating a prediction image and the operation of the apparatus for generating a prediction image using a single coding mode among color components according to embodiments of the present invention will now be explained in detail with reference to FIGS. 1 and 2.

It is assumed that an input color image Fn in the apparatus for generating a prediction image using a single coding mode is an RGB image. The color image is processed in units of blocks. In order to increase encoding efficiency, an inter method using temporal prediction in which prediction is performed by estimating motion from a previous prediction image F'n−1, and an intra method using spatial prediction in which prediction is performed in a block spatially close to a current prediction image F'n, are used. At this time, a most effective mode or relatively efficient mode among a variety of encoding modes is selected.

In the spatial prediction mode, that is, in the intra mode, a spatial prediction image is generated using identical prediction mode for R, G, and B, and correlation between residues of R, G, and B is increased.

In the temporal prediction, that is, in the inter mode, identical block sizes and identical motion vectors are used for R, G, and B, and when a prediction image is expanded, identical filters are used for interpolation and a temporal prediction image is generated.

When a spatial prediction method is used, it is determined which mode, when employed, is the most efficient or relatively efficient. For example, in MPEG-4 AVC/H.264, prediction is performed using 9 prediction methods in each 4×4 block, as shown in FIG. 8. In addition, prediction is performed using a 16×16 block size and 4 prediction methods. At this time, the prediction is performed by applying identical prediction methods to R, G, and B. The bit quantity and/or the distortion of the picture quality obtained as the result of performing the prediction in each mode are calculated, and a prediction method having the minimum value obtained by adding the number of bits amount and/or the distortion is selected. At this time, the number of bits can be calculated by performing a transform and quantization and then entropy encoding. To determine the distortion of the picture quality, the mean of the squares of differences between the original image and a restored image obtained by restoring an image can be used:

$$D = \sum_{i=0}^{N} (p_i - q_i)^2, \qquad (1)$$

where D is numerical value of distortion of picture quality, p is the pixel value of a current image, q is the pixel value of a previous image. Also, when adding the distortion of the picture quality and the number of bits, in order to obtain the same units for the two amounts, a predetermined constant is used as indicated in the following equation 2:

$$L = D + \lambda R \qquad (2)$$

Here, R is a bit rate, and λ is the predetermined constant. This value is calculated for each prediction method and a prediction method having the smallest L is selected.

In the inter method, blocks are divided as shown in FIG. 9 and motion estimation is performed. At this time, using the same method as described above, L is calculated for each prediction method and a method having the smallest L is selected. It is understood that a prediction method can be selected using only either one, D, R or λR.

At this time, an identical prediction method is applied to each of the R, G, and B components. Also, identical motion vectors are used for each of the R, G, and B components. In addition, in order to detail motion prediction, a method of interpolating and expanding a prediction image is used. In an embodiment of the present invention, a 6-tap filter or a bilinear filter can be used.

Figure 10:
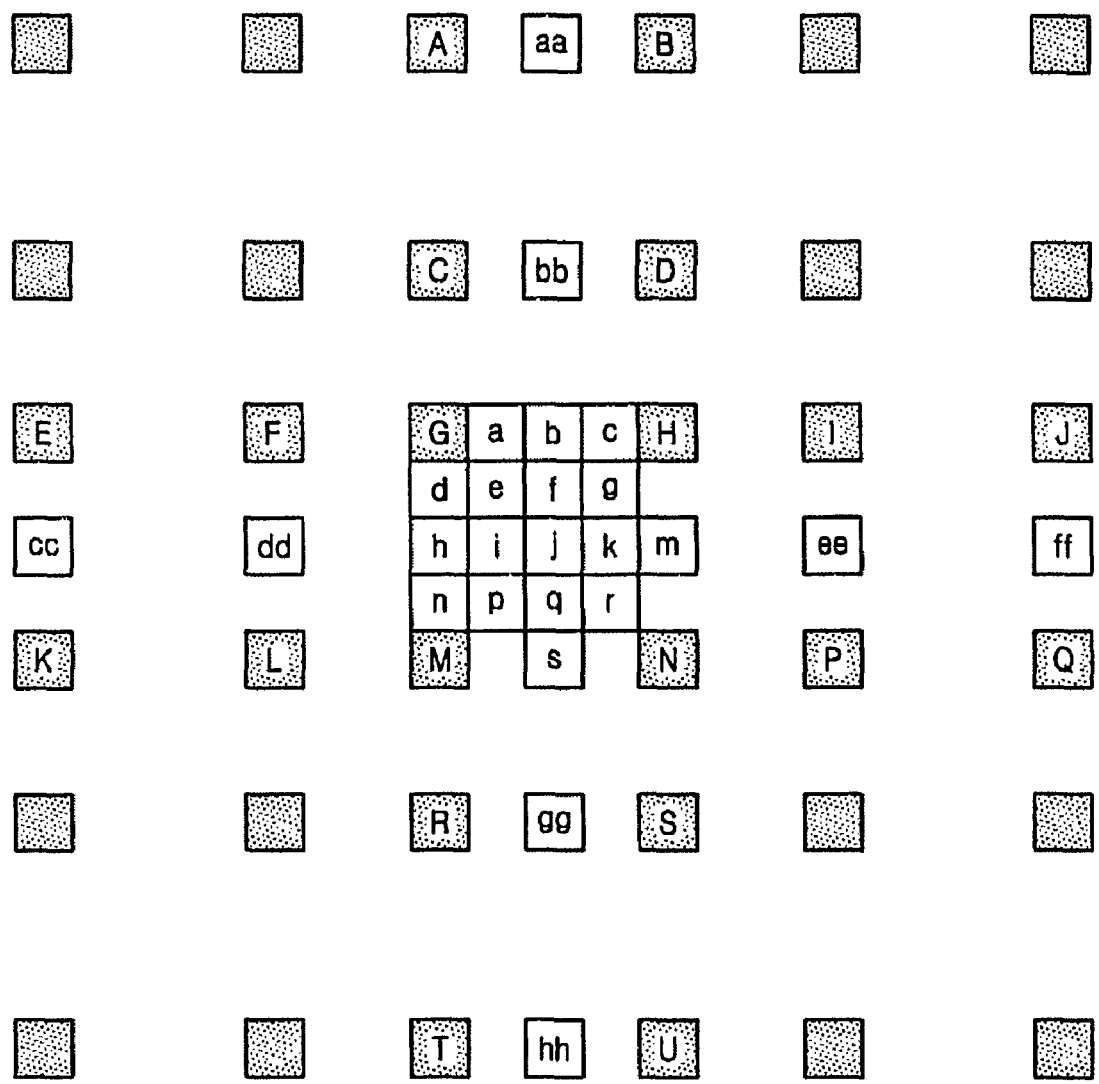
FIG. 10 illustrates an MC(Motion Compensation) interpolation method using a 6-tap filter according to an embodiment of the present invention.

FIG. 9 illustrates an example of block partitions using the 6-tap filter when the image of a previous frame is interpolated four times in both the vertical and horizontal directions in order to interpolate and expand a prediction image. The 6-tap filter is used in the MPEG-4 AVC/H.264 standard. In FIG. 10, when pixels A through U are in the previous frame, ¼ or ½ interpolation are performed according to the following method.

First, pixels b and h at ½ pixel positions in the vertical direction or horizontal direction, respectively, are each interpolated using 6 adjacent pixels of the previous frame according to the following equations 3 and 4:

$$b1=(E-5\times F+20\times G+20\times H-5\times I+J)$$

$$h1=(A-5\times C+20\times G+20\times M-5\times R+T) \quad (3)$$

$$b=Clip1((b1+16)>>5)$$

$$h=Clip1((h1+16)>>5) \quad (4)$$

Here, Clip1 (x) clips x to be within a bit range of an image pixel. In an 8-bit image, if x is less than 0, x is set to 0, and if x is greater than 255, x is set to 255. Other values are maintained as their original values. The filter tap used for the interpolation is [1, −5, 20, 20, −5, 1], which is a 6-tap filter using more adjacent pixels.

Pixel j at ½ pixel positions in the vertical and horizontal directions is interpolated using 6 previously restored vertically or horizontally adjacent pixels at ½ pixel positions, according to the following equation 5:

$$j1=cc-5\times dd+20\times h1+20\times m1-5\times ee+ff$$

or $$j1=aa-5\times bb+20\times b1+20\times s1-5\times gg+hh$$

$$j=Clip1(j1+512)>>10) \quad (5)$$

Here, adjacent pixels cc, dd, h1, m1, ee, and ff or aa, bb, b, s1, gg, and hh are intermediate results obtained by interpolation using the 6-tap filter through equation 3.

Similarly, values of pixels s and m at ½ pixel positions are restored from pixels s1 and m1 according to equation 4. Pixels a, c, d, n, f, i, k, and q at ¼ pixel positions are obtained as the mean of two adjacent pixels in the vertical direction or in the horizontal direction according to the following equation 6:

$$a=(G+b+1)>>1$$

$$c=(H+b+1)>>1$$

$$d=(G+h+1)>>1$$

$$n=(M+h+1)>>1$$

$$f=(b+j+1)>>1$$

$$i=(h+j+1)>>1$$

$$k=)j+m+1)>>1$$

$$q=)j+s+1)>>1 \quad (6)$$

Pixels e, g, p, and r at ¼ pixel positions are obtained as the mean of two diagonally adjacent pixels:

$$e=(b+h+1)>>1$$

$$g=(b+m+1)>>1$$

$$p=(h+s+1)>>1$$

$$r=(m+s+1)>2 \quad (7)$$

Figure 11:
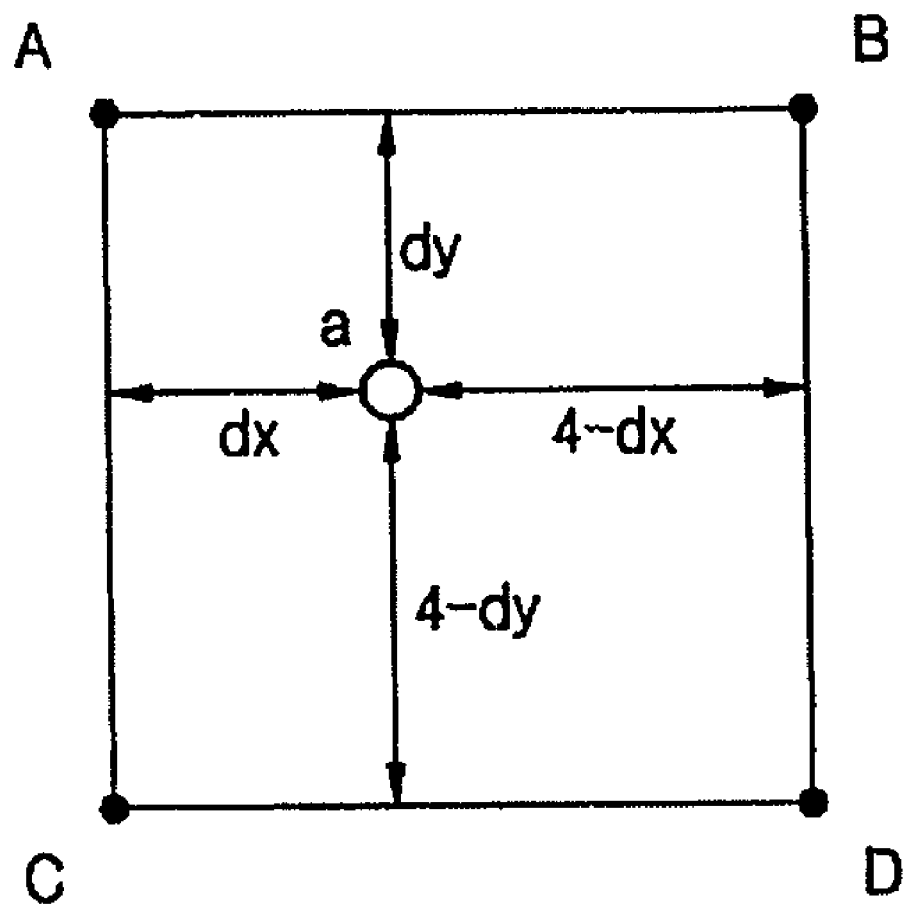
FIG. 11 illustrates an MC(Motion Compensation) interpolation method using a bilinear filter according to an embodiment of the present invention.

FIG. 11 illustrates an example of using the bilinear interpolation method when the image of a previous frame is interpolated four times in both the vertical and horizontal directions in order to interpolate and expand a prediction image. The bilinear interpolation method is used in the MPEG-4 AVC/H.264 standard.

In pixels A, B, C, and D of the previous frame, pixel at a ¼ or ½ pixel position is obtained according to the following equation 10:

$$a=((4-dx)\times(4-dy)\times A+dx\times(4-dy)\times B+(4-dx)\times dy\times C+dx\times dy\times D+8)>>4 \quad (10)$$

Here, dx denotes the horizontal distance from A or C to a, and dy denotes the vertical distance from A or B to a in the vertical direction.

The bilinear interpolation method uses fewer adjacent pixels, and more adjacent values that are in close proximity to a value to be interpolated than the method using the 6-tap filter.

According to an aspect of the present embodiment, identical interpolation methods are applied to the R, G, and B components so that R, G, and B residue signals are similar to each other. As a result, the effect of the residue transform is increased. In order to apply identical interpolation methods, the 6-tap filter can be applied to all of the R, G, and B components. Also, the bilinear method can be applied to all of the R, G, and B components. Also, an optimal method can be selected for each block and the selected method can be used to encode the block. Thus, when spatiotemporal prediction is performed, by using identical prediction modes for all of the R, G, and B components, and using identical interpolation methods, correlation between the residues of the R, G, and B components can be increased.

Figures 8A, 8B:
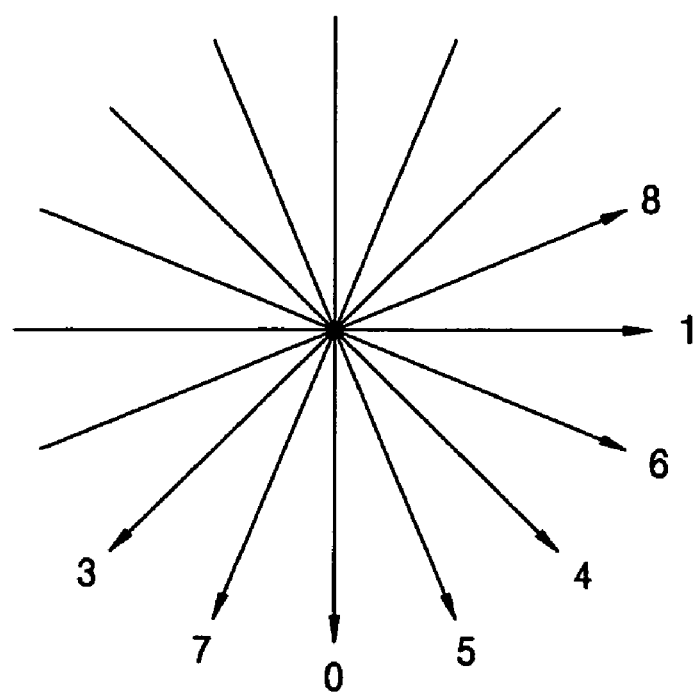
FIGS. 8A and 8B illustrate the positions of adjacent pixels for spatial prediction, the positions of pixels of a current block to be predicted, and prediction directions according to the present invention.

FIG. 8A illustrates positions of adjacent pixels used for spatial prediction and positions of pixels of a current block. This method is the same as a method used in the MPEG-4 AVC/H.264 standard encoding method. In FIG. 8A, in order to predict block data Pa, Pb, . . . , Pq in a 4×4 block, pixel values P0, P1, . . . , P12 that are previously encoded and restored, and are spatially adjacent to the block data Pa, Pb, . . . , Pq to be predicted are used. FIG. 8B shows 9 prediction directions 0 through 8 that can be used to predict a current block by projecting from a spatially adjacent pixel. For example, in the case of direction 0, adjacent pixel values P1, P2, P3 and P4 are projected in the vertical direction and data Pa, Pe, Pi, and Pm are predicted as the pixel value P1, data Pb, Pf, Pj, and Pn are predicted as the pixel value P2, data Pc, Pg, Pk and Po are predicted as the pixel value P3, and data Pd, Ph, Pl and Pq are predicted as the pixel value P4. For other directions, prediction is performed through projection in the same manner.

FIG. 9 illustrates a method of dividing a macroblock that is used as a basic unit of motion for temporal prediction of an image. This method is used in the MPEG-4 AVC/H.264 standard encoding method. Referring to FIG. 9, the 16×16 macroblock is divided into a variety of sized blocks, including a 16×16 block, 16×8 blocks, 8×16 blocks, and/or 8×8 blocks, and motion vectors are obtained and an image value is predicted temporally. The 8×8 blocks are again divided into an 8×8 block, 8×4 blocks, 4×8 blocks, and/or 4×4 blocks such that fine motion can be accurately sensed.

As described above, by using the prediction image generated in the spatial prediction image generation unit 100, the spatial bit quantity/picture quality distortion calculation unit 142 calculates the number of bits and/or the distortion of the picture quality obtained in each mode of the intra method.

Also, the temporal bit quantity/picture quality distortion calculation unit 144 calculates the number of bits and/or the distortion of the picture quality obtained in each mode of the inter method. Then, the performance comparison unit 146 compares the calculated values, and selects an encoding mode having a highest encoding efficiency or relatively high encoding efficiency. The single mode prediction image generation unit 160 generates a prediction image by applying the selected encoding mode.

The calculation and comparison of the number of bits and/or picture quality distortion in the selection of the mode having the highest encoding efficiency performed by the encoding mode selection unit 140 described above is just part of one embodiment of the present invention. According to other embodiments of the present invention, an encoding mode having a highest encoding efficiency can be selected using other elements than the number of bits and/or picture quality distortion.

Figure 3:
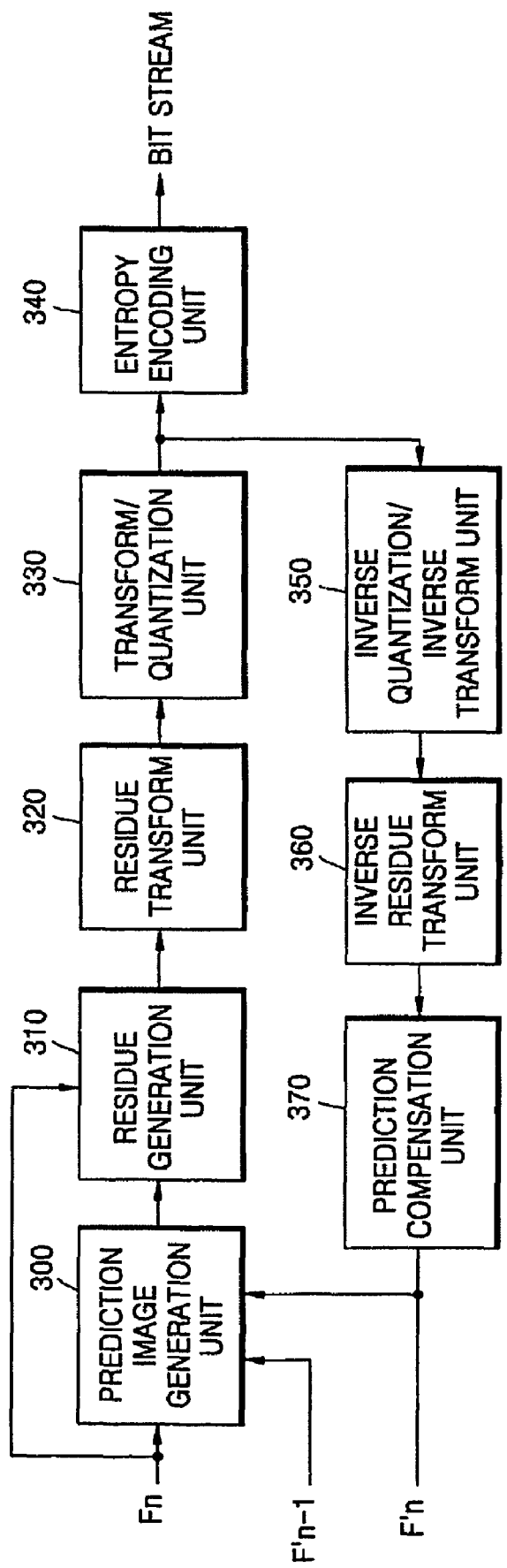
FIG. 3 is a block diagram of an image and video encoding apparatus using a single coding mode among color components according to an embodiment of the present invention.

FIG. 3 is a block diagram of an image and video encoding apparatus using a single coding mode for all color components according to an embodiment of the present invention. The image and video encoding apparatus includes a prediction image generation unit 300, a residue generation unit 310, a transform/quantization unit 330, an entropy encoding unit 340, an inverse quantization/inverse transform unit 350, a residue inverse transform unit 360, and a prediction compensation unit 370.

The prediction image generation unit 300 generates a prediction image using an identical encoding mode for each image component in an original image composed of at least two image components. The prediction image generation unit 300 uses the prediction image generation apparatus according to an embodiment of the present invention of FIG. 1. Accordingly, the prediction image generation unit 300 can include a spatial prediction image generation unit 100, a temporal prediction image generation unit 120, an encoding mode selection unit 140, and a single mode prediction image generation unit 160 as shown in FIG. 1.

The residue generation unit 310 generates a residue corresponding to the difference between the original image and a prediction image. The residue transform unit 320 performs a residue transform on the residue generated in the residue generation unit 310 using the correlation of each residue of the image components. The transform/quantization unit 330 performs a transform and quantization on the residue, which is transformed by the residue transform unit 330, in units of blocks of a predetermined size. The entropy encoding unit 340 performs entropy encoding on the data transformed and quantized by the transform/quantization unit 330 and generates a bitstream.

The inverse quantization/inverse transform unit 350, the inverse residue transform unit 360, and the prediction compensation unit 370 perform inverse quantization/inverse transform, inverse residue transform, and prediction compensation, respectively, on the data transformed and quantized by the transform/quantization unit 330 to generate a prediction image F'n of a current frame and a prediction image F'n−1 of a previous frame, which are used when a prediction image is generated in the prediction image generation unit 300.

Figure 4:
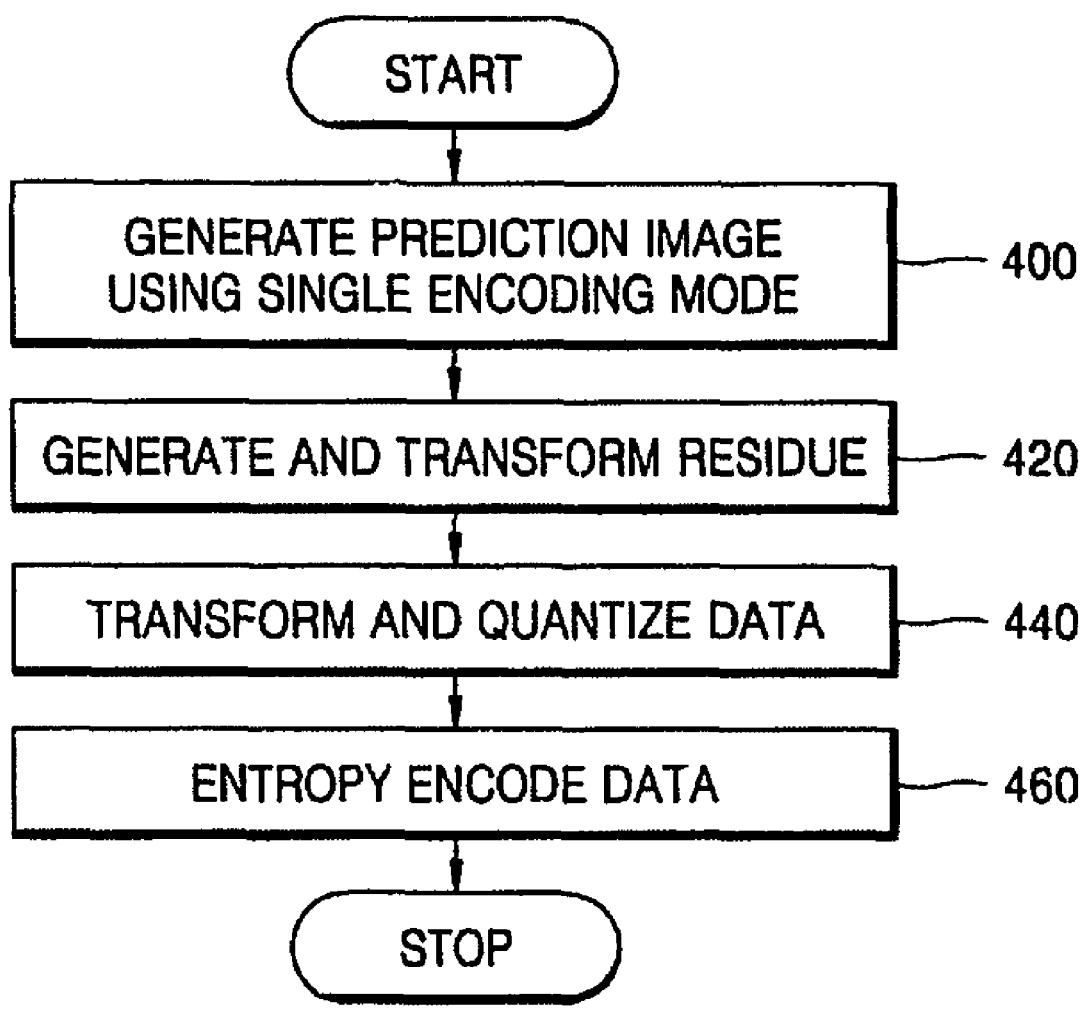
FIG. 4 is a flowchart of an image and video encoding method using a single coding mode for all color components according to an embodiment of the present invention.

FIG. 4 is a flowchart of an image and video encoding method using a single coding mode for all color components according to an embodiment of the present invention.

First, using a single encoding mode, a prediction image is generated in operation 400. Operation 400 is the same as the prediction image generation method described above with reference to FIG. 2, and further explanation will be omitted.

Then, by obtaining the difference between the original image and the prediction image, a residue is generated and the generated residue is transformed in operation 420. Then, a transform, such as a DCT transform, and quantization, are performed in operation 440, and by entropy encoding the transformed and quantized data, a bitstream is generated in operation 460.

The input color image Fn of the encoding apparatus according to an embodiment of the present invention is an RGB image, and the image is processed in units of blocks. In order to increase encoding efficiency, the encoding apparatus uses an inter method using temporal prediction in which prediction is performed by estimating motion from a previous prediction image F'n−1, and an intra method using a spatial prediction in which prediction is performed in a block spatially close to a current prediction image F'n (100). At this time, a most effective mode among a variety of encoding modes is selected by the encoding mode selection unit 140.

When a spatial prediction mode is selected, identical prediction modes are used for all of the R, G, and B components so that the correlation between the residues of the R, G, and B components can be increased. When temporal prediction is performed, identical block sizes and identical motion vectors are used for the R, G, and B components, and when a prediction image is expanded, identical filters are used for the interpolation for the R, G, and B components. Here, if spatial or temporal prediction encoding is performed according to the selected encoding mode information, the residue signal of each of the R, G, and B components can be obtained. In order to remove overlapping information in each component, a residue transform is performed between each component. Then, in order to compress each component in units of blocks, a transform, such as a discrete cosine transform (DCT) or a discrete integer transform, is performed, and then transform coefficients are quantized and entropy encoded to generate a bitstream. An image restored through the inverse process of the encoding is used for prediction encoding in subsequent blocks.

Figure 5:
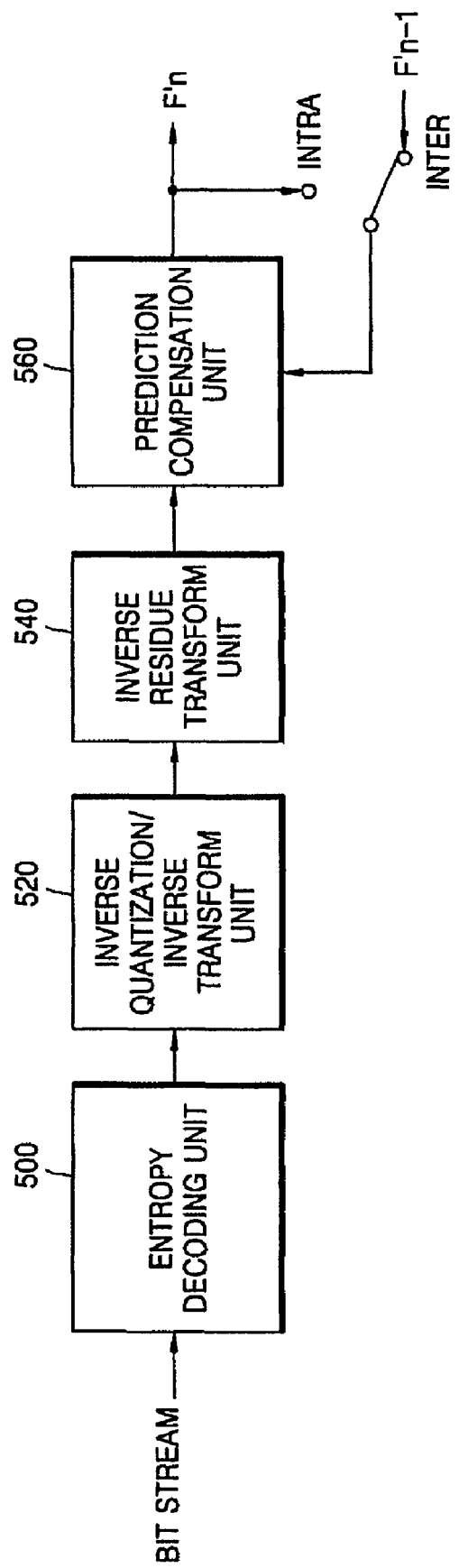
FIG. 5 is a block diagram of an image and video decoding apparatus using a single coding mode for all color components according to an embodiment of the present invention.

FIG. 5 is a block diagram of an image and video decoding apparatus using a single coding mode for all color components according to an embodiment of the present invention. The image and video decoding apparatus includes an entropy decoding unit 500, an inverse quantization/inverse transform unit 520, an inverse residue transform unit 540, and a prediction compensation unit 560.

The entropy decoding unit 500 entropy decodes a bitstream, and the inverse quantization/inverse transform unit 520 performs inverse quantization and an inverse transform of the entropy decoded data in units of blocks of a predetermined size.

Assuming that the difference between an original image composed of at least two image components and a prediction image in the original image is a residue, the inverse residue transform unit 540 inverse transform the transformed residue using the relation between the inverse quantized and inverse transformed data, that is, the relation between residues of the image components, and by doing so, restores residue data.

The prediction compensation unit 560 adds to the restored residue data a prediction image generated using an identical encoding mode for each of the R, G and B components, and restores an image.

Figure 6:
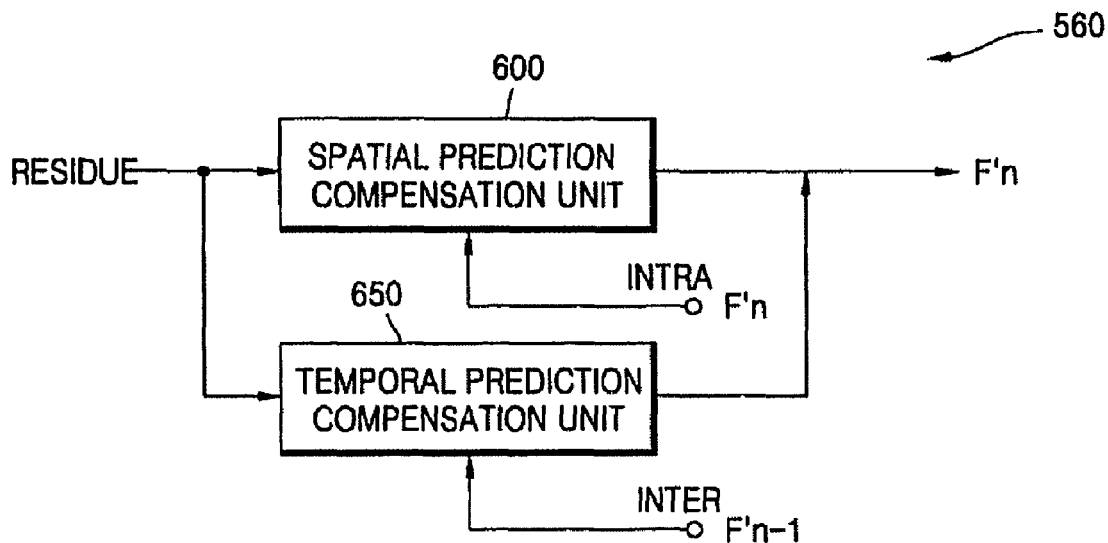
FIG. 6 is a detailed block diagram of a prediction compensation unit according to an embodiment of the present invention.

FIG. 6 is a detailed block diagram of the prediction compensation unit 560. The prediction compensation unit 560 includes a spatial prediction compensation unit 600 and a temporal prediction compensation unit 650.

In the intra method, for each component of the original image, the spatial prediction compensation unit 600 adds to the restored residue data a prediction image obtained by applying an identical prediction direction from a pixel spatially adjacent to the pixel block of a current frame, and by doing so, restores an image.

In the inter method, for each component of the original image, the temporal prediction compensation unit 650 adds to the restored residue data a prediction image obtained by applying identical motion estimation and motion compensation methods in units of blocks of identical size between a previous frame and a current frame, and by doing so, restores an image.

Figure 7:
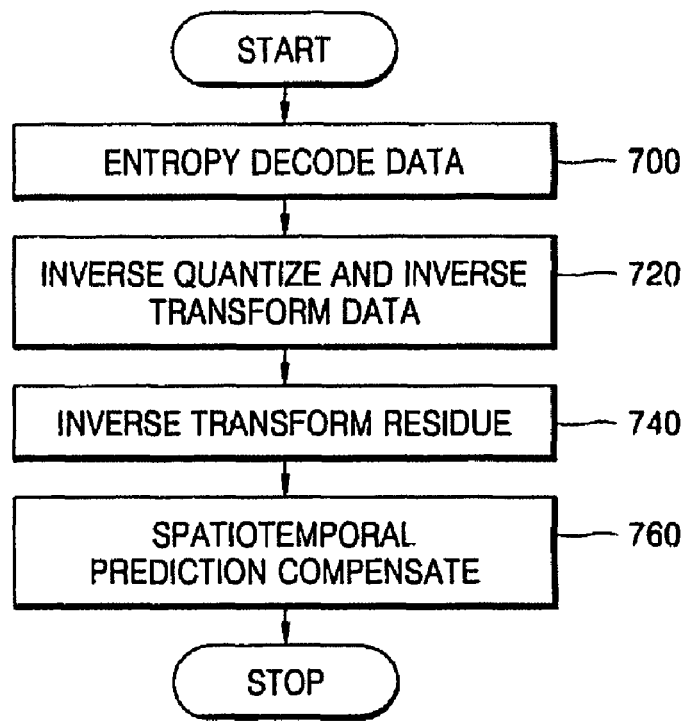
FIG. 7 is a flowchart of an image and video decoding method using a single coding mode for all color components according to an embodiment of the present invention.

FIG. 7 is a flowchart of an image and video decoding method using a single coding mode for all color components according to an embodiment of the present invention.

Assuming that the difference between an original image composed of at least two image components and a prediction image in the original image is a residue, residue information is decoded from a bitstream and restored. If the bitstream was generated by entropy encoding, the bitstream is entropy decoded in operation 700. Then, the entropy decoded data is inverse quantized and inverse transformed in units of blocks of a predetermined size in operation 720. By using the relationship between the inverse quantized and inverse transformed data, that is, the relationship between residues of the image components, the transformed residue is inverse transformed and residue data is restored in operation 740. By adding a prediction image generated using an identical encoding mode for each of the R, G and B components to the residue of each image component, an image is restored in operation 760. The acquisition of the prediction image of operation 760 will now be explained. In the intra method, for each component of the original image, a prediction image is obtained by applying an identical prediction direction from a pixel spatially adjacent to the pixel block of a current frame to be predicted. In the inter method, for each component of the original image, a prediction image is obtained by applying identical motion estimation and motion compensation methods to blocks of identical size between a previous frame and a current frame.

Through an inverse process of the encoding process described above with reference to FIGS. 3 and 4, an image is restored from the compressed bitstream.

The compressed data is processed by the entropy decoding unit 500, the inverse quantization and inverse transform unit 520, and the inverse residue transform unit 540, and the residue signal of each of the R, G, and B components is obtained. In the case of the inter mode, the residue value of each component is added to a value predicted from the previous predicted image F'n−1, and in the case of the intra mode, the residue value of each component is added to a value predicted from a spatially adjacent block value using a spatial prediction method. An image is restored using the residue value.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the prediction image generation method and apparatus using a single coding mode for all color components, and the image and video encoding and/or decoding method and apparatus using a single coding mode for all color components of the present invention, an identical prediction method is used for each color component when the color components of a color image is prediction-encoded using spatially adjacent pixels or temporally close pixels. By doing so, redundancy information between prediction error signals of the color components is increased such that encoding efficiency can be increased.

For example, when an RGB color image is used and the RGB input image is not converted into a YCbCr image but is directly encoded in the RGB domain, spatial prediction and temporal prediction are performed in accordance with the statistical characteristics of the RGB image such that the encoding efficiency can be enhanced while maintaining high picture quality.

Furthermore, by directly compressing an RGB video image that can be directly obtained from a device without performing the conventional process of converting the RGB video image into the YCbCr domain, there is no loss of image quality such as distortion of color that occurs when the RGB domain is transformed into the YCbCr domain because encoding is directly performed in the RGB domain. Accordingly, the method and apparatus of the present invention are appropriate for applications such as digital cinema and digital archive, which require high quality image information.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments should be considered in a descriptive sense only, and are not for purposes of limitation. Therefore, the scope of the invention is defined not by the detailed description of the invention but by the appended claims, and all differences within the scope will be construed as being included in the present invention.

What is claimed is:

1. A spatial prediction image generation method comprising:
   applying an identical prediction direction for each image component in an original image composed of at least two image components; and
   obtaining a spatial prediction image from a pixel spatially close to a pixel block of a predetermined size of a current frame.

2. The method of claim 1, wherein the size of the pixel block is 4×4, and any one of 9 prediction directions is determined to be the prediction direction.

3. A non-transitory computer readable recording medium having embodied thereon a computer program for executing the method of claim 1.

4. A temporal prediction image generation method comprising:
   applying an identical motion vector and motion interpolation method for each image component in an original image composed of at least two image components; and
   obtaining a temporal prediction image by estimating motion in units of blocks of a predetermined size between a previous frame and a current frame of each of the image components.

5. A non-transitory computer readable recording medium having embodied thereon a computer program for executing the method of claim 4.

6. A prediction image generation method comprising:
   applying an identical prediction direction for each image component in an original image composed of at least two image components;

obtaining a spatial prediction image from a pixel spatially close to a pixel block of a predetermined size of a current frame;

applying an identical block size, motion vector, and motion interpolation method for each image component in an original image composed of at least two image components;

obtaining a temporal prediction image by estimating motion in units of blocks of a predetermined size between a previous frame and a current frame of each of the image components;

selecting an encoding mode using the spatial prediction image and the temporal prediction image; and generating a prediction image by identically applying the selected encoding mode to each component.

7. The method of claim 6, wherein, in the selection of the encoding mode, the bit quantity and/or distortion of the picture quality of each of the spatial prediction image and the temporal prediction image are calculated and an encoding mode corresponding to the smallest sum obtained by adding the bit quantity and/or distortion of the picture quality for each of the spatial prediction image and the temporal prediction image is selected as the encoding mode.

8. A non-transitory computer readable recording medium having embodied thereon a computer program for executing the method of claim 6.

9. A prediction image generation apparatus comprising:
a spatial prediction image generation unit applying an identical prediction direction for each image component in an original image composed of at least two image components, and obtaining a spatial prediction image from a pixel spatially close to a pixel block of a predetermined size of a current frame;
a temporal prediction image generation unit applying an identical block size, motion vector, and motion interpolation method for each image component in an original image composed of at least two image components, and obtaining a temporal prediction image by estimating motion in units of blocks of a predetermined size between a previous frame and a current frame of each of the image components;
an encoding mode selection unit selecting an encoding mode by using the spatial prediction image and the temporal prediction image; and
a single mode prediction image generation unit generating a prediction image by identically applying the encoding mode selected in the encoding mode selection unit to each component.

10. The apparatus of claim 9, wherein the encoding mode selection unit comprises:
a spatial bit quantity and/or picture quality distortion calculation unit calculating the bit quantity and/or distortion of the picture quality of the spatial prediction image;
a temporal bit quantity/picture quality distortion calculation unit calculating the bit quantity and distortion of the picture quality of the temporal prediction image; and
a performance comparison unit comparing values obtained by adding the bit quantity and/or the picture quality distortion of each of the spatial prediction image and the temporal prediction image, and selecting an encoding mode corresponding to the smaller value.

11. An image encoding apparatus using a single coding mode for all color components comprising:
a prediction image generation unit generating a prediction image by using an identical encoding mode for each image component in an original image composed of at least two image components;
a residue generation unit generating a residue corresponding to the difference between the original image and the prediction image; and
an encoding unit generating a bitstream by encoding the residue data.

12. The apparatus of claim 11, wherein the prediction image generation unit comprises:
a spatial prediction image generation unit obtaining a prediction image by applying an identical prediction direction from a pixel spatially adjacent to a pixel block of a current frame for each image component of the original image when performing an intra method;
a temporal prediction image generation unit obtaining a prediction image by applying identical motion estimation and motion interpolation methods in units of blocks of identical size between a previous frame and a current frame for each image component of the original image when performing an inter method;
an encoding mode selection unit selecting an encoding mode by using the spatial prediction image and the temporal prediction image; and
a single mode prediction image generation unit generating a prediction image by identically applying the encoding mode selected in the encoding mode selection unit to each component of the color image.

13. The apparatus of claim 12, wherein the encoding mode selection unit comprises:
a spatial bit quantity and/or picture quality distortion calculation unit calculating the bit quantity and/or distortion of the picture quality of the spatial prediction image;
a temporal bit quantity and/or picture quality distortion calculation unit calculating the bit quantity and/or distortion of the picture quality of the temporal prediction image; and
a performance comparison unit comparing values obtained by adding the bit quantity and/or the picture quality distortion of each of the spatial prediction image and the temporal prediction image, and selecting an encoding mode corresponding to the smaller value.

14. The apparatus of claim 11, further comprising a residue transform unit performing a residue transform on the residue generated by the residue generation unit using a correlation between residues of the image components,
wherein the encoding unit generates the residue of each image component as a bitstream.

15. The apparatus of claim 14, further comprising a transform/quantization unit performing transform and quantization on the residue transformed by the residue transform unit, in units of blocks of a predetermined size,
wherein the encoding unit generates each of the transformed and quantized coefficients as a bitstream.

16. An image encoding method using a single coding mode for all color components comprising:
generating a prediction image by using an identical encoding mode for each image component in an original image composed of at least two image components;
generating a residue corresponding to the difference between the original image and the prediction image; and
generating a bitstream by encoding the residue data.

17. The method of claim 16, wherein the generating of the prediction image comprises:
obtaining a prediction image by applying an identical prediction direction from a pixel spatially adjacent to a pixel block of a current frame for each image component of an original image composed of at least two image components;

obtaining a prediction image by applying an identical block size, motion vector, and motion interpolation method for each image component in an original image composed of at least two image components, and by estimating motion in units of blocks of a predetermined size between a previous frame and a current frame of each of the image components;

selecting an encoding mode by using the spatial prediction image and the temporal prediction image; and generating a prediction image by identically applying the selected encoding mode to each component of the color image.

18. The method of claim 17, wherein in the selecting of the encoding mode, the bit quantity and/or distortion of the picture quality of each of the spatial prediction image and the temporal prediction image are calculated and an encoding mode corresponding to a smallest sum of the bit quantity and/or distortion of the picture quality of each of the spatial prediction image and the temporal prediction image is selected as an encoding mode.

19. The method of claim 16, further comprising performing a residue transform on the generated residue using a correlation between residues of the image components,
wherein, in the generating of the bitstream, the transformed residue for each image component is generated as a bitstream.

20. The method of claim 19, further comprising performing a transform and quantization on the transformed residue in units of blocks of a predetermined size,
wherein, in the generating of the bitstream, each of the transformed and quantized coefficients is generated as a bitstream.

21. A non-transitory computer readable recording medium having embodied thereon a computer program for executing the method of claim 16.

22. An image decoding apparatus using a single coding mode for all color components comprising:
a spatial prediction compensation unit restoring an image using a prediction image obtained by applying an identical prediction direction from a pixel spatially close to a pixel block of a current frame for each image component of an original image composed of at least two image components, when performing an intra method; and
a temporal prediction compensation unit restoring an image using a prediction image obtained by applying identical motion estimation and motion interpolation methods in units of blocks of identical size between a previous frame and a current frame for each image component of the original image, when performing an inter method.

23. The apparatus of claim 22, further comprising: a data restoration unit restoring residue information by decoding the residue information from a bitstream when the difference between the original image and the prediction image in the original image is a residue,
wherein the spatial prediction compensation unit restores the image by adding the predication image to the restored residue data.

24. The apparatus of claim 22, further comprising: a data restoration unit restoring residue information by decoding the residue information from a bitstream when the difference between the original image and the prediction image in the original image is a residue,
wherein the temporal prediction compensation unit restores the image by adding the predication image to the restored residue data.

25. The apparatus of claim 22, further comprising an inverse quantization/inverse transform unit performing inverse quantization and an inverse transform on transformed and quantized data in units of blocks of a predetermined size if the data restored in the data restoration unit is transformed and quantized residue data,
wherein the prediction compensation unit performs prediction compensation by adding to the inverse quantized and inverse transformed residue a prediction image generated using an identical encoding mode, for each image component.

26. An image decoding method using a single coding mode for all color components comprising:
restoring an image using a prediction image obtained by applying an identical predication direction from a pixel spatially close to a pixel block of a current frame for each image component of an original image composed of at least two image components, when performing an intra method; and
restoring an image using a prediction image obtained by applying identical motion estimation and motion interpolation methods in units of blocks of identical size between a previous frame and a current frame for each image component of the original image, when performing an inter method, and restoring an image using the prediction image.

27. The method of claim 26, further comprising: restoring residue information by decoding the residue information from a bitstream when it is assumed that the difference between the original image composed of at least two image components and the prediction image in the original image is a residue,
wherein, when the intra method is performed, the image is restored by adding the prediction image to the restored residue data.

28. The method of claim 26, further comprising: restoring residue information by decoding the residue information from a bitstream when it is assumed that the difference between the original image composed of at least two image components and the prediction image in the original image is a residue,
wherein, when the inter method is performed, an image is restored by adding the prediction image to the restored residue data.

29. The method of claim 26, further comprising performing inverse quantization and an inverse transform on the generated residue in units of blocks of a predetermined size,
wherein, when the inter method is performed, an image is restored by adding to the inverse quantized and inverse transformed residue a prediction image generated using an identical encoding mode, for each image component.

30. A non-transitory computer readable recording medium having embodied thereon a computer program for executing the method of claim 26.

31. A prediction image generation method for an image having at least two image components, comprising:
obtaining a first prediction image for the at least two image components using a first image prediction method;
obtaining a second prediction image for at least two image components using a second image prediction method;
selecting an encoding mode using the first and the second prediction images based on the obtained prediction images; and
generating a prediction image by applying the selected encoding mode to each component.

32. The method of claim 31, wherein one of the first and the second image prediction methods is a spatial prediction image method.

33. The method of claim 31, wherein one of the first and the second image prediction methods is a temporal prediction image method.

34. The method of claim 31, wherein, in the selection of the encoding mode, a bit quantity and/or distortion of the picture quality of each of the first prediction image and the second prediction image are calculated and an encoding mode corresponding to the smallest sum obtained by adding the bit quantity and/or distortion of the picture quality for each of the first prediction image and the second prediction image is selected as the encoding mode.

35. A prediction image generation apparatus comprising:

an image generation unit to generate a first and a second prediction images for at least two image components;

an encoding mode selection unit selecting an encoding mode by using the first and the second prediction images; and a single prediction image generation unit generating a prediction image by using the encoding mode selected in the encoding mode selection unit to each component.

36. The apparatus for claim 35, wherein the image generation unit comprises;

a spatial prediction image part; and a temporal prediction image generation part.

37. The method of claim 35, wherein the encoding mode selection unit to calculate a bit quantity and/or distortion of the picture quality of each of the first prediction image and the second prediction image and an encoding mode corresponding and select the encoding mode having the smallest sum obtained by adding the bit quantity and/or distortion of the picture quality for each of the first prediction image and the second prediction image.

* * * * *

UNITED STATES PATENT AND TRADEMARK OFFICE
CERTIFICATE OF CORRECTION

| | | |
|---|---|---|
| PATENT NO. | : 8,019,001 B2 | Page 1 of 1 |
| APPLICATION NO. | : 11/362920 | |
| DATED | : September 13, 2011 | |
| INVENTOR(S) | : Kim et al. | |

It is certified that error appears in the above-identified patent and that said Letters Patent is hereby corrected as shown below:

Column 18, Line 16 (Approx.), In Claim 26, delete "predication" and insert --prediction--, therefor.

Signed and Sealed this
Seventh Day of February, 2012

David J. Kappos
*Director of the United States Patent and Trademark Office*